(12) United States Patent
Viswanathan et al.

(10) Patent No.: US 8,437,588 B2
(45) Date of Patent: May 7, 2013

(54) SYSTEM AND METHOD FOR GENERATING AN OPTICAL VECTOR VORTEX BEAM HAVING TWO LOBES

(75) Inventors: Nirmal Kumar Viswanathan, Hyderabad (IN); Kavita Vemuri, Hyderabad (IN)

(73) Assignee: University of Hyderabad, Gachibowli, Hyderabad (IN)

( * ) Notice: Subject to any disclaimer, the term of this patent is extended or adjusted under 35 U.S.C. 154(b) by 255 days.

(21) Appl. No.: 12/754,916

(22) Filed: Apr. 6, 2010

(65) Prior Publication Data

US 2011/0243498 A1 Oct. 6, 2011

(51) Int. Cl.
*G02B 6/27* (2006.01)

(52) U.S. Cl.
USPC ................................. 385/28; 385/11

(58) Field of Classification Search ............ 385/11, 385/28
See application file for complete search history.

(56) References Cited

U.S. PATENT DOCUMENTS

| | | | |
|---|---|---|---|
| 5,115,486 A | 5/1992 | Bader et al. | |
| 7,599,069 B2 * | 10/2009 | Toussaint et al. | 356/491 |
| 2006/0268408 A1 * | 11/2006 | Toussaint et al. | 359/487 |
| 2007/0115551 A1 * | 5/2007 | Spilman et al. | 359/494 |
| 2009/0202191 A1 * | 8/2009 | Ramachandran | 385/11 |
| 2010/0142890 A1 * | 6/2010 | Alfano et al. | 385/28 |

FOREIGN PATENT DOCUMENTS

WO WO 2010/005579 1/2010

OTHER PUBLICATIONS

U.S. Appl. No. 61/118,097, filed Nov. 28, 2008 by Alfano et al.*
Bahabad and Arie, "Generation of Optical Vortex Beams by Nonlinear Wave Mixing," Optics Express, vol. 15, No. 26, Dec. 2007.
Viswanathan and Inavalli, "Generation of optical vector beams using a two-mode fiber," Optics Letters, vol. 34, No. 8, Apr. 2009.
Alexeyev et al., "Intensely twisted elliptic optical fibres maintaining propagation of a single optical vortex," Rapid Communication, Sep. 2006.
Inavalli and Viswanathan, "Switchable vector vortex beam generation using an optical fiber," Optics Communications, Nov. 2009.
Zhan and Leger, "Microellipsometer with radial symmetry," Applied Optics, vol. 14, No. 22, Aug. 2002.
Zhan, "Cylindrical vector beams: from mathematical concepts to applications," Advances in Optics and Photonics 1, 1-57, 2009.
Thyagarajan et al., "Vector Modes of an Optical Fiber in the Weakly Guiding Approximation," Journal of Lightwave Technology, vol. 7, No. 1, Jan. 1989.
Savchencko and Zel'dovich, "Wave propagation in a guiding structure: one step beyond the paraxial approximation," J. Opt. Soc. Am. B, vol. 13, No. 2, Feb. 1996.

(Continued)

*Primary Examiner* — Ryan Lepisto
*Assistant Examiner* — Andrew Jordan (57) ABSTRACT

Optical vector vortex beams may be generated from few-mode or multi-mode optical fiber by introducing linearly or circularly polarized light into the fiber. By adjusting at least one of the polarization of the light, the incident angle of the light coupled into the fiber, and the length of the fiber, one or more vector modes supported by the fiber may be selected. The resulting output from the fiber may be a vortex beam that can be collimated and used for precise manipulation of objects on order of a micrometer or a nanometer in diameter.

17 Claims, 5 Drawing Sheets

OTHER PUBLICATIONS

Willig, et al., "STED microscopy reveals that synaptotagmin remains clustered after synaptic vesicle exocytosis," Nature, vol. 440, Apr. 2006.

Maurer, et al., "Tailoring of arbitrary optical vector beams," New Journal of Physics 9, 2007.

Basistiy, et al., "Optical wavefront dislocations and their properties," Optics Communications, 1992, Sep. 1995.

Helseth, "Roles of polarization, phase and amplitude in solid immersion lens systems," Optics Communications, 191, May 2001.

Grosjean, et al., "An all-fiber device for generating radially and other polarized light beams," Optics Communications, 203, Mar. 2002.

Volpe and Petrov, "Generation of cylindrical vector beams with few-mode fibers excited by Laguerre-Gaussian beams," Optics Communications, 237, Mar. 2004.

Volyar and Fadeeva, "Optics of Singularities of the Field of a Low-Mode Fiber: I. Circular Disclinations," Optics and Spectroscopy, vol. 85, No. 2, 1998.

Liberman and Zel'dovich, "Spin-orbit interaction of a photon in an inhomogeneous medium," Physical Review A, vol. 46, No. 8, Oct. 1992.

Romea and Kimura, "Modeling of inverse Cerenkov laser acceleration with axicon laser-beam focusing," Physical Review D, vol. 42, No. 5, Sep. 1990.

Sick and Hecht, "Orientational Imaging of Single Molecules by Annular Illumination," Physical Review Letters, vol. 85, No. 21, Nov. 2000.

Molina-Terriza, et al., "Observation of the Dynamical Inversion of the Topological Charge of an Optical Vortex," Physical Review Letters, vol. 87, No. 2, Jul. 2001.

Nienhuis, "Angular Momentum and Vortices in Optics," Structured Light and Its Applications: An Introduction to Phase-Structured Beams and Nanoscale Optical Forces, Chapter 2, David Andrews, 2008.

Romero and Andrews, "Nanoscale Optics: Interparticle Forces," Structured Light and Its Applications: An Introduction to Phase-Structured Beams and Nanoscale Optical Forces, Chapter 4, David Andrews, 2008.

Dholakia and Reece, "Near-Field Optical Micromanipulation," Structured Light and Its Applications: An Introduction to Phase-Structured Beams and Nanoscale Optical Forces, Chapter 5, David Andrews, 2008.

Nieminen, et al., "Optical Vortex Trapping and the Dynamics of Particle Rotation," Structured Light and Its Applications: An Introduction to Phase-Structured Beams and Nanoscale Optical Forces, Chapter 8, David Andrews, 2008.

Padgett and Leach, "Rotation of Particles in Optical Tweezers," Structured Light and Its Applications: An Introduction to Phase-Structured Beams and Nanoscale Optical Forces, Chapter 9, David Andrews, 2008.

Saleh and Teich, "Beam Optics," Fundamentals of Photonics, Chapter 3, 2007.

Snyder and Love, "Fundamental properties of modes," Optical Waveguide Theory, Chapter 11, 1983.

Snyder and Love, "Circular fibers," Optical Waveguide Theory, Chapter 14, 1983.

Snyder and Love, "Mode coupling," Optical Waveguide Theory, Chapter 27, 1983.

Snyder and Love, "Weak-guidance approximation," Optical Waveguide Theory, Chapter 32, 1983.

Kotlyar, V. et al., "Rotation of multimodal Gauss-Laguerre light beams in free space and in a fiber—a comparison," Optics and Lasers in Engineering, vol. 29, No. 4, pp. 343-350, 1998.

* cited by examiner

FIG. 5

SYSTEM AND METHOD FOR GENERATING AN OPTICAL VECTOR VORTEX BEAM HAVING TWO LOBES

BACKGROUND

Optical vortexes are light beams that travel in helical patterns around their axis of propagation. The electromagnetic waves comprising the beam may cancel each other out at the axis. Thus, the cross-section of an optical vortex beam may resemble a circle of light with a hole aligned at the axis. The helical rotation of such a light beam exhibits an angular momentum that can be used to induce torque in objects on the order of a micrometer to nanometer in size. Thus, an optical vortex beam may be used, for example, to manipulate any responsive material, including cells and tissues.

SUMMARY

Systems and methods for generating an optical vector vortex beam are presented. In particular, such a beam may be created by introducing polarized light into an off-the-shelf optical fiber at an incident angle that results in the light traversing the fiber in one or more vector modes. Based on at least some of the polarization characteristics of the light, the incident angle, the vector mode, and the length of the optical fiber, a particular type of optical vector vortex beam is generated.

Optical vector vortex beams may have applicability across a wide-range of technologies, including biophotonics, micro- and nano-manipulation, communication, laser etching and cutting, metrology, and molecular polarization spectroscopy. Thus, it is desirable to be able to generate these beams with inexpensive, off-the-shelf components. Additionally, it is also desirable to generate optical vector vortex beams with a stable polarization.

Accordingly, in an example embodiment, an optical vector vortex beam is generated using an optical fiber that supports a plurality of vector modes. A coupling component may be configured to couple a polarized beam of light into a proximate end of the optical fiber. This polarized beam of light may excite a vector mode supported by the optical fiber to produce the optical vector vortex beam from a distal end of the optical fiber. The vector mode may be a one of a transverse electric mode, a transverse magnetic mode, a transverse electromagnetic mode, and a hybrid mode. To excite one or more of these modes, the coupling component may be configured to couple the polarized beam of light into the optical fiber by launching meridional and/or skew rays into the optical fiber.

The polarized beam of light may be derived from un-polarized light produced by light sources such as a laser. This un-polarized light may be passed through a polarizing component to produce the polarized beam of light. The resulting polarization may be linear or circular. In general, the polarization component of the light may be adjustable to select the vector mode from the plurality of vector modes supported by the optical fiber. For instance, if the polarization is circular, the vector mode may be selected based on at least the circular orientation of the polarized beam of light.

This example embodiment may also include an optional element adjacent to the distal end of the optical fiber that is configured to collimate the optical vector vortex beam. In this way, the optical vector vortex beam maintains a stable focus so that the beam can be used to precisely manipulate objects on the molecular level.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For instance, throughout the embodiments herein, the term "optical fiber" may refer to any form of optical fiber, including optical fiber that supports few modes or many modes. The refractive index of such an optical fiber's core may be step-index or graded-index, and the cross-section of the core may be circular, elliptical, or variations thereof. Additionally, the light source discussed herein may be a laser, light-emitting diode, or similar device. Moreover, the term "coupling" may or may not imply a physical attachment.

Figure 1:
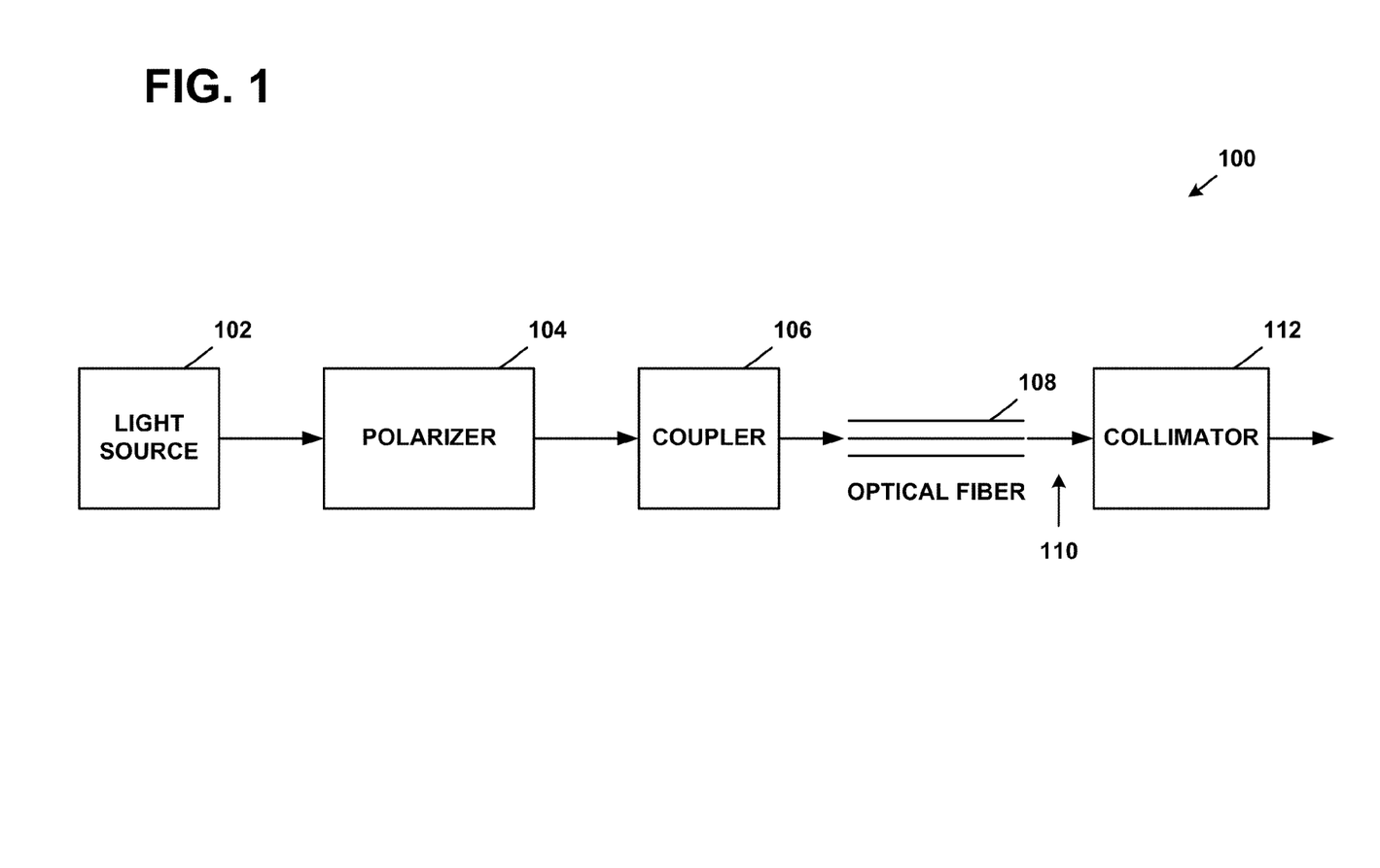
FIG. 1 is a depiction of a system for generating an optical vector vortex beam in accordance with an example embodiment.

FIG. 1 illustrates an example arrangement 100 that can be used to generate an optical vector vortex beam. Such a beam may travel in a twisted, helical pattern (e.g., resembling a corkscrew) or in a polygonal cross-section around its axis of propagation. Thus, a cross-section of the beam's axis of propagation may resemble a substantially circular ring-like pattern of light with a hole approximately aligned with the axis. This hole may occur due to the waves comprising the beam cancelling each other out in the region of the axis. It should be understood that the ring-like pattern may not be a complete circle.

Light source 102 may be any type of light source that emits a beam of reasonably coherent light, but un-polarized light. The emitted beam may have variable orientations. It is desirable for this light to have a wavelength in a range of wavelengths for which optical fiber 108 exhibits low attenuation. For example, light source 102 may be a laser emitting light with a wavelength between 600 nm and 950 nm. One embodiment of such a light source is a Helium-Neon (HeNe) laser generating light with a wavelength of approximately 632 nm. However, other types of lasers operating at other wavelengths may be used instead.

The emitted beam of light may be introduced into polarizer 104, which may polarize the beam of light. It should be understood that a beam of light may comprise one or more waves. The electric and magnetic fields of such a wave may be perpendicular to the direction of the wave's propagation and perpendicular to each other. These fields may or may not have the same frequency, amplitude, or phase. Such a wave may be categorized based on the pattern that the vector sum of the wave's electrical and magnetic components traces in a cross section of the wave's axis of propagation.

A linearly polarized wave is one for which the ratio of the strengths of the electrical and magnetic components is approximately constant. The vector sum of these components may trace a linear pattern in such a cross section. A circularly polarized wave is one for which the electrical and magnetic components are approximate 90 degrees out of phase with one another. The vector sum of these components may trace a circular pattern in either a clockwise or anti-clockwise fashion. Waves that are not linearly or circularly polarized are often referred as being elliptically polarized, and the vector sum of their electrical and magnetic components may trace an elliptical pattern.

The resulting polarized beam of light may then engage coupler 106, which may couple the beam into optical fiber 108. It should be understood that an optical fiber is typically comprised of a cylindrical glass-based or plastic-based core surrounded by a cladding. The refractive index of the core is greater than that of the cladding, so that light coupled into the core bounces off of the boundary between the core and cladding as the light propagates the length of the optical fiber. Optical fiber with a relatively large core diameter (e.g., 10 micrometers or more) may support multiple paths (or "modes") near the core's axis that the light can take when propagating. This type of optical fiber is often referred to as multi-mode fiber.

Light can be introduced into optical fiber at a given mode by coupling the light into the optical fiber at a corresponding angle. Generally speaking, optical fibers exhibit a critical angle, measured from the fiber's longitudinal axis. A beam of light coupled into the optical fiber at an angle greater than the critical angle will be refracted into the optical fiber's cladding. However, if the beam of light is coupled into the optical fiber at an angle less than the critical angle, the beam will traverse the optical fiber in one of the supported modes. The numerical aperture of an optical fiber characterizes the range of angles over which the optical fiber can accept light.

Figure 2:
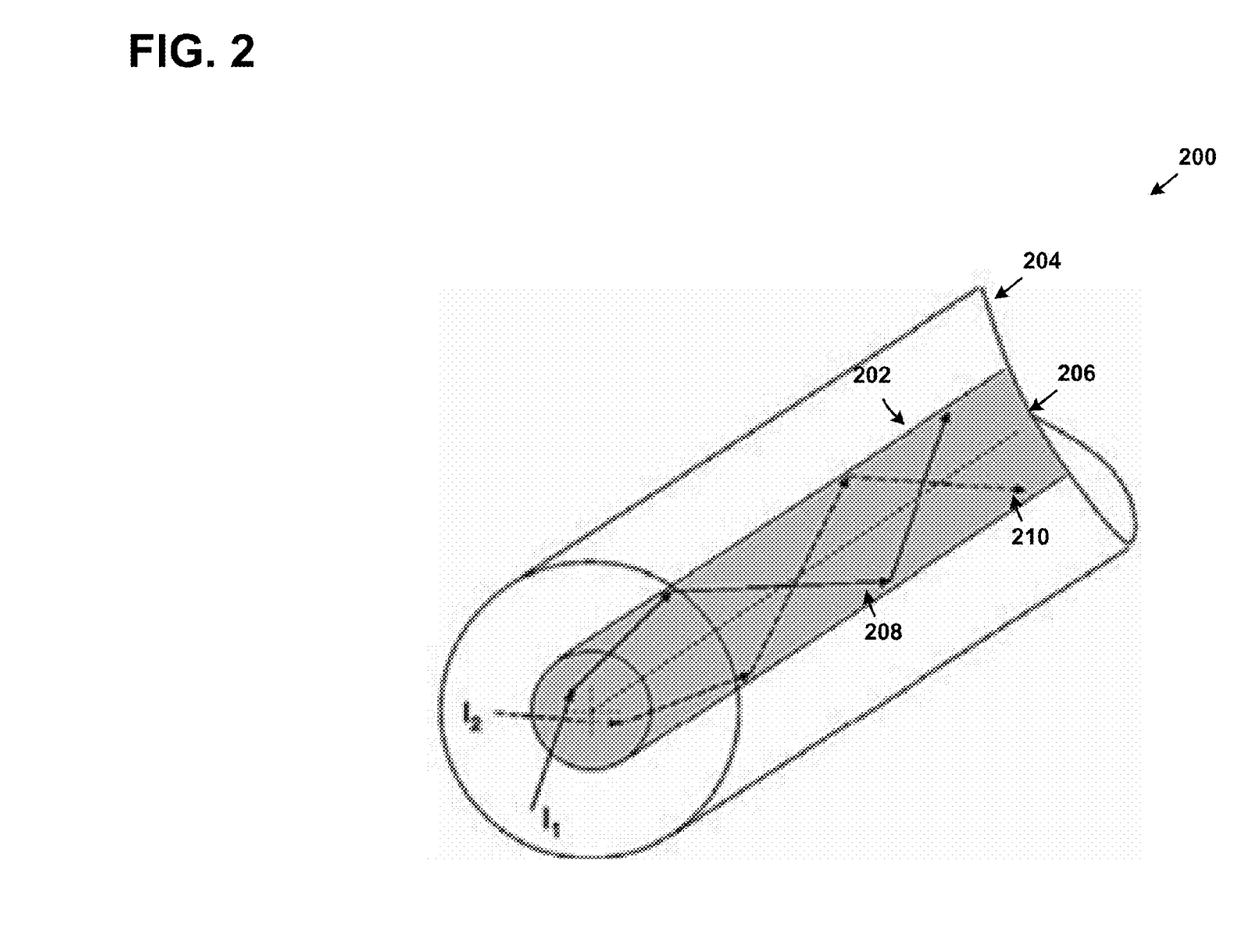
FIG. 2 is a depiction of light coupled into two different modes of an optical fiber in accordance with an example embodiment.
Figure 3:
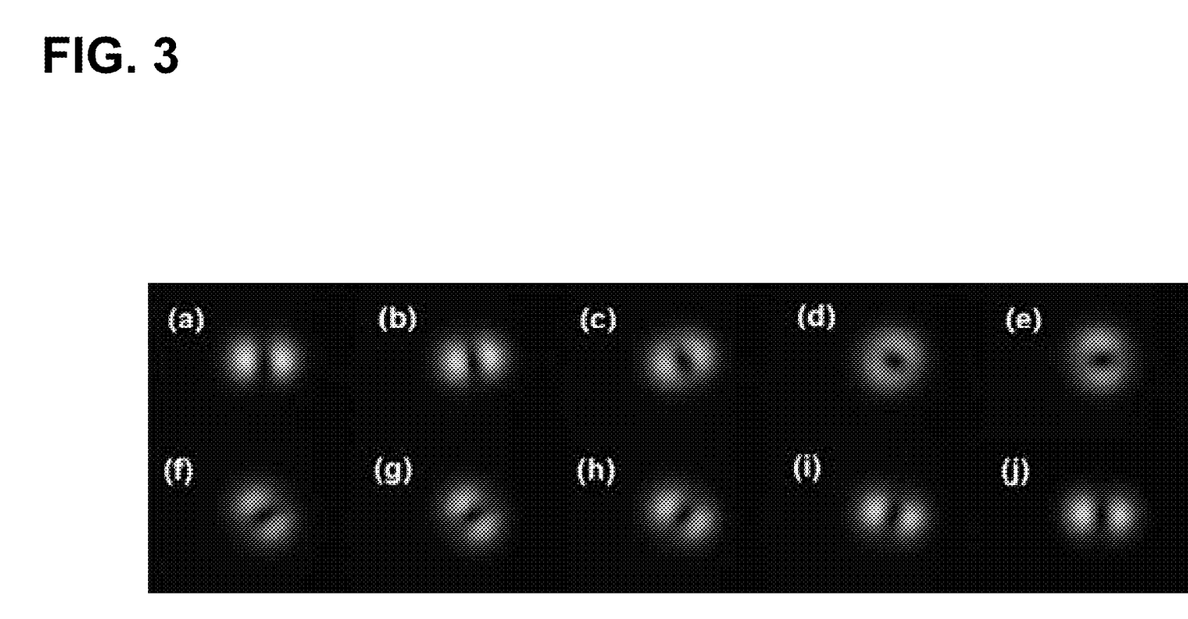
FIG. 3 is depiction of optical vector vortex beams that can be produced by an example embodiment.

Turning momentarily to FIG. 2, a depiction of optical fiber 200 provides both cross-sectional and longitudinal views of modes supported by this fiber. Light propagates the length of optical fiber 200 inside core 202, by bouncing off the boundary between core 202 and cladding 204. Light from input sources $I_1$ and $I_2$ propagate in modes 208 and 210, respectively. Beams of light in modes that pass through axis 206 of core 202 are often referred to as meridional rays, while beams of light in modes that do not pass through axis 206 of core 202 are often referred to as skew rays.

FIG. 2 illustrates step-index optical fiber, where the core and cladding each have a relatively uniform index of refraction. Alternate embodiments may use graded-index optical fiber, in which each radial section of core 202 may have a refractive index that is inversely proportional to section's radial distance from axis 206. Thus, for graded-index optical fiber, radial sections of core 202 closer to axis 206 have a higher refractive index than radial sections near cladding 204. Consequently, light follows sinusoidal paths down the optical fiber.

Generally speaking, the modes of an optical fiber can be determined based on the fiber's numerical aperture and core diameter, as well as the wavelength of light being introduced into the fiber. These modes may be categorized as either linearly polarized or vector modes. In some types of fiber, the linearly polarized modes are superpositions of one or more vector modes. Vector modes may include transverse electric (TE) modes, in which there is no electric field in the direction of propagation, transverse magnetic (TM) modes, in which there is no magnetic field in the direction of propagation, transverse electromagnetic (TEM), in which there are no electric or magnetic fields in the direction of propagation, and hybrid modes (HE), in which there are nonzero electric and magnetic fields in the direction of propagation. By exciting one or more of these vector modes, optical vector vortex beams may be created.

Turning back to FIG. 1, it should be understood that coupler 106 may take various forms. For instance, coupler 106 may include a lens that focuses the polarized beam of light at a particular angle in order to excite a mode in optical fiber 108. However, coupler 106 could be combined in various ways with polarizer 104. Additionally, coupler 106 need not be physically connected to optical fiber 108. Instead coupler 106 may aim the polarized beam of light into optical fiber 108 from a distance.

The light 110 emerging from the distal end of optical fiber 108 may be an optical vector vortex beam. In order to focus light 110 for precision use, light 110 may be passed through a collimator 112. Collimator 112 may comprise another lens that serves to parallelize the rays of light so that they can be used to manipulate micro- and nano-particles (e.g., objects on the order of a micron in diameter).

With respect to the components of system 100, more or fewer components, as well as other components not shown in FIG. 1, may be used without departing from the scope of the invention. Thus, optical vector vortex beams may be generated just from the introduction of light into optical fiber 108. Other arrangements, including various subsets of the components of system 100 may be used as well. For instance, optical vector vortex beams could be generated from an arrangement including just coupler 106 and optical fiber 108, just polarizer 104, coupler 106, and optical fiber 108, and so on.

System 100 may be arranged in several ways in order to allow selection of a particular mode of optical fiber 108. For instance, a half-wave plate (HWP) may be placed between polarizer 104 and coupler 106. (Alternatively, the HWP could be combined with either of polarizer 104 or coupler 106.) A HWP may comprise a birefringent crystal, and may shift the phase offset between the electrical and magnetic fields of polarized light by 180 degrees (half of a wavelength). This shift occurs due to light polarized in the direction of one of the electric or magnetic fields being slowed as it passes through the HWP.

The HWP may be rotatably mounted in order to control the polarization direction of the beam of light introduced into optical fiber 108. Rotation of the HWP may result in different vector modes being traversed by the beam of light as it travels through fiber optical fiber 108. For example, a rotation of as little as approximately five degrees can result in the excitation of different vector modes in optical fiber 108.

FIGS. 3(a)-(j) illustrate light intensity patterns measured at or near the distal end of optical fiber 108 for an arrangement of system 100 with a HWP. Initially, in FIG. 3(a), the HWP is rotationally aligned such that a vertical linearly polarized beam of light is coupled into optical fiber 108. This initial alignment is referred to as zero degrees of rotation. The patterns in FIGS. 3(a)-3(j) are created by rotating the HWP from zero degrees to 90 degrees of rotation in increments of ten degrees.

Alternatively, a quarter-wave plate (QWP) may be placed between polarizer 104 and coupler 106. (Or, like the case of the HWP, the QWP could be combined with either of polarizer 104 or coupler 106.) The composition and operation of a QWP may be similar to that of a HWP, except that the QWP shifts the phase offset between the electrical and magnetic fields of polarized light by 90 degrees (a quarter of a wavelength). By adjusting the plane of incident light so that it makes 45 degree angle with the optic axis of the QWP, the QWP can convert the polarization of the beam of light coming from the polarizer 104 from linear to circular or vice versa.

The QWP may also be rotatable mounted to control whether the resulting circularly polarized light propagates in a clockwise or anti-clockwise direction. Adjusting the incident angle of the light introduced into optical fiber 108, the circular orientation of the QWP, and/or the rotation angle of the QWP may also be used to selectively excite of one or more different vector modes in optical fiber 108.

Figure 4:
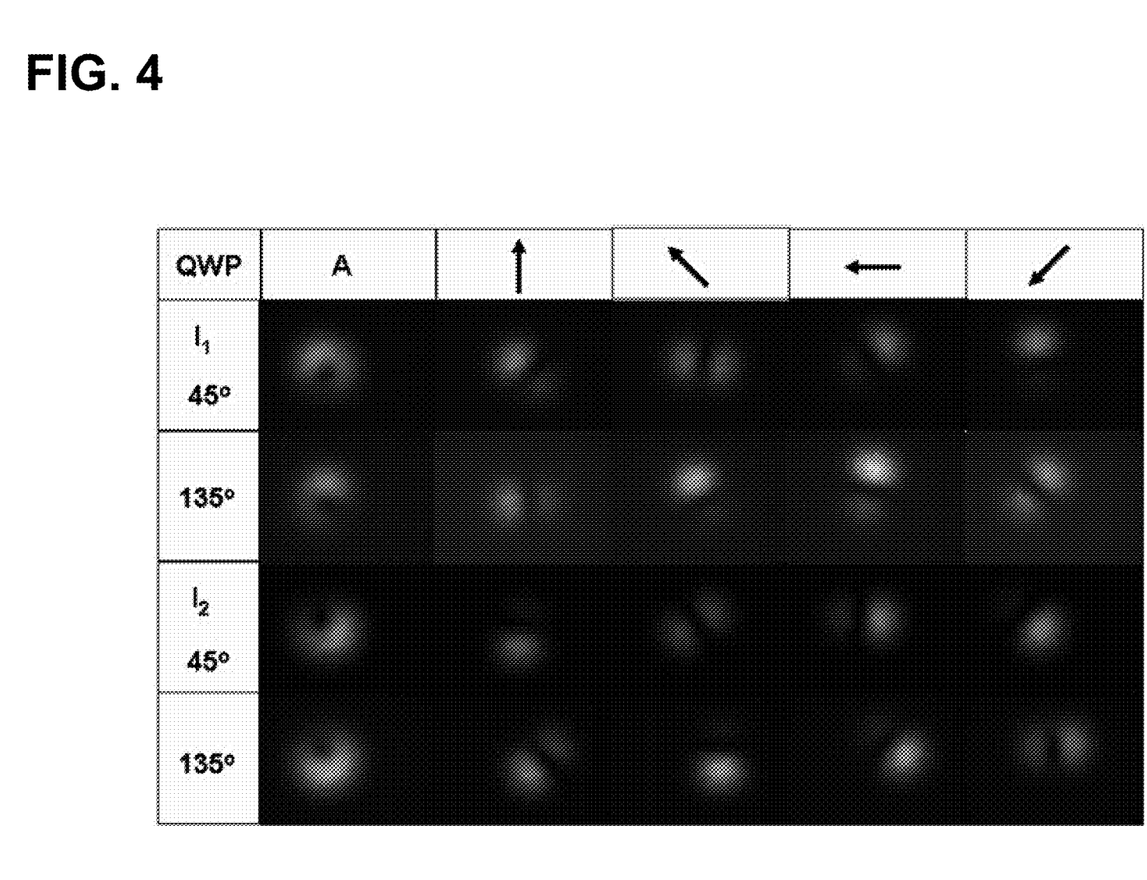
FIG. 4 is another depiction of optical vector vortex beams that can be produced by an example embodiment.

FIG. 4 illustrates light intensity patterns measured at or near the distal end of optical fiber 108 for an arrangement of system 100 with a QWP. These intensity patterns are generated for QWP orientations of 45 degrees and 135 degrees, with respect to the polarization of the input beam of light, of two different input beam positions ($I_1$ and $I_2$). The "A" column shows the output beam without analysis. Additionally, for each combination of orientation and beam position, the optical vector vortex beam emerging from the distal end of optical fiber 108 is measured at four different angles of the analyzer. As shown on the x-axis of FIG. 4, these angles may be zero degrees, 45 degrees, 90, degrees, and 135 degrees in the anti-clockwise direction. For example, shown in the top row of FIG. 4, rotating the axis of analysis in the anti-clockwise direction results in two-lobe beam patterns rotating in the same direction, indicating that the output beam pattern obtained before analysis may be due to a linear combination of TM and TE modes excited with same phase.

Figure 5:
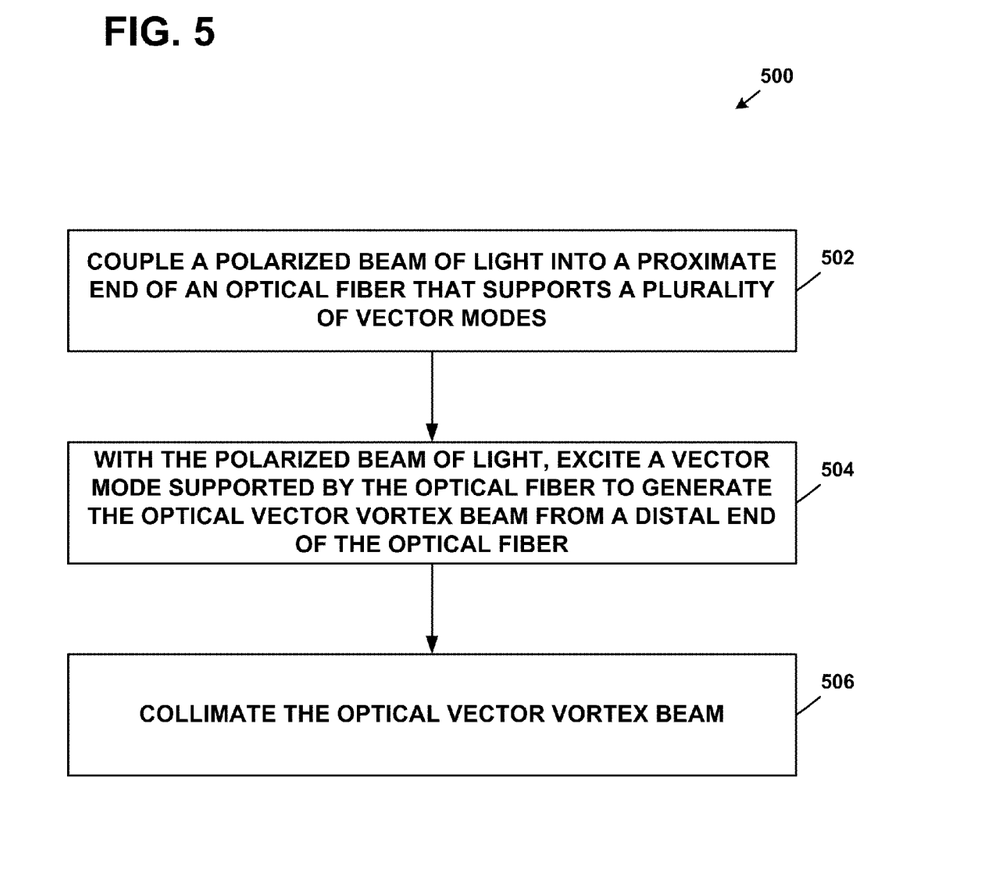
FIG. 5 is a flow chart in accordance with an example embodiment.

FIG. 5 is a flow chart depicting an example method 500 for generating an optical vector vortex beam. At step 502, a polarized beam of light is coupled into a proximate end of an optical fiber that supports a plurality of vector modes. This coupling may introduce the light into the an incident angle such that, at step 504, the polarized beam of light excites a vector mode supported by optical fiber, thereby generating the optical vector vortex beam that emanates from the distal end of the optical fiber. Then, at step 506, the optical vector vortex beam may be collimated. A HWP, QWP, or similar element may be used in conjunction with the coupling process to select one or more of the supported vector modes. The HWP or QWP may be rotatably mounted to assist in this selection.

It should be understood that the methods, procedures, operations, devices, and systems illustrated in FIGS. 1-5 may be modified without departing from the spirit of the invention. For example, these methods, procedures, operations, devices, and systems may comprise more or fewer steps or components than appear herein, and these steps or components may be combined with one another, in part or in whole.

Furthermore, the present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for generating an optical vector vortex beam, the system comprising:
   an optical fiber that supports a plurality of vector modes;
   a coupling component configured to couple a polarized beam of light into a proximate end of the optical fiber, wherein the polarized beam of light excites vector modes supported by the optical fiber to produce the optical vector vortex beam from a distal end of the optical fiber; and
   a polarizer component configured to produce the polarized beam of light from a non-polarized beam of light, wherein the polarizer component comprises a quarter-wave plate that is adjustable to control whether the optical vector vortex beam propagates in a clockwise or anti-clockwise direction,
   wherein the system is configured to cause a two-lobe optical vector vortex beam pattern rotating in the anti-clockwise direction by rotating an axis of analysis of the quarter-wave plate in the anti-clockwise direction to excite a linear combination of TM and TE vector modes with the same phase.

2. The system of claim 1, further comprising:
   a light source component configured to generate the non-polarized beam of light with variable orientation.

3. The system of claim 1, wherein the polarizer component linearly polarizes the beam of light.

4. The system of claim 1, wherein the polarizer component circularly polarizes the beam of light with variable circular orientation.

5. The system of claim 4, wherein the vector mode is selected based on at least the circular orientation of the polarized beam of light.

6. The system of claim 1, wherein the coupling component is configured to couple the polarized beam of light into the optical fiber by launching skew rays into the optical fiber.

7. The system of claim 1, further comprising:
   an optical element adjacent to the distal end of the optical fiber and configured to collimate the optical vector vortex beam.

8. A method for generating an optical vector vortex beam using an optical fiber that supports a plurality of vector modes, the method comprising:
   coupling a polarized beam of light into a proximate end of the optical fiber, wherein the polarized beam of light is produced from a non-polarized beam of light by a polarizer component;
   the polarized beam of light exciting vector modes supported by the optical fiber to generate the optical vector vortex beam from a distal end of the optical fiber, wherein the polarizer component comprises a quarter-wave plate that is adjustable to control whether the optical vector vortex beam propagates in a clockwise or anti-clockwise direction; and
   rotating an axis of analysis of the quarter-wave plate in the anti-clockwise direction to excite a linear combination of TM and TE vector modes with the same phase, causing a two-lobe optical vector vortex beam pattern rotating in the anti-clockwise direction.

9. The method of claim 8, wherein the polarized beam of light is circularly polarized with variable circular orientation.

10. The method of claim 9, wherein the vector mode is selected based on at least the circular orientation of the polarized beam of light.

11. The method of claim 8, wherein the polarized beam of light is coupled into the optical fiber by launching skew rays into the optical fiber.

12. The method of claim 8, further comprising:
    collimating the optical vector vortex beam.

13. The system of claim 1, wherein the quarter-wave plate is rotatable to control whether the optical vector vortex beam propagates in a clockwise or anti-clockwise direction.

14. The system of claim 1, wherein the coupling component is connected to the optical fiber.

15. The system of claim 1, wherein the coupling component is not connected to the optical fiber.

16. The system of claim 1, wherein the polarizer component elliptically polarizes the beam of light.

17. A method for generating an optical vector vortex beam using an optical fiber that supports a plurality of vector modes, the method comprising:
    coupling a polarized beam of light into a proximate end of the optical fiber, wherein the polarized beam of light is produced from a non-polarized beam of light by a polarizer component;
    the polarized beam of light exciting a first vector mode supported by the optical fiber to generate the optical vector vortex beam from a distal end of the optical fiber, wherein the polarizer component comprises a half-wave plate;
    rotating the half-wave plate by approximately 5 degrees; and
    in response to rotating the half-wave plate by approximately 5 degrees, exciting a second vector mode supported by the optical fiber to generate the optical vector vortex beam from the distal end of the optical fiber, wherein the first and second vector modes are different.

* * * * *

UNITED STATES PATENT AND TRADEMARK OFFICE
CERTIFICATE OF CORRECTION

PATENT NO. : 8,437,588 B2  
APPLICATION NO. : 12/754916  
DATED : May 7, 2013  
INVENTOR(S) : Viswanathan et al.

Page 1 of 1

It is certified that error appears in the above-identified patent and that said Letters Patent is hereby corrected as shown below:

In the Specifications

In Column 1, Line 7, delete "Optical vortexes" and insert - - Optical vector vortexes - -, therefor.

In Column 1, Line 10, delete "optical vortex beam" and insert - - optical vector vortex beam - -, therefor.

In Column 1, Lines 14-15, delete "optical vortex beam" and insert - - optical vector vortex beam - -, therefor.

In the Claims

In Column 8, Line 52, in Claim 17, delete "5degress;" and insert - - 5 degrees; - -, therefor.

Signed and Sealed this  
Tenth Day of September, 2013

Teresa Stanek Rea  
*Acting Director of the United States Patent and Trademark Office*